United States Patent [19]
Roulin et al.

[11] Patent Number: 5,522,506
[45] Date of Patent: Jun. 4, 1996

[54] BLISTER PACKS

[75] Inventors: Monique Roulin, Schaffhauen; Hans-Rudolf Nägeli, Neuhausen am Rheinfall, both of Switzerland; Andreas Christel, Piscataway, N.J.

[73] Assignee: Alusuisse-Lonza Services Ltd., Zurich, Switzerland

[21] Appl. No.: 346,890

[22] Filed: Nov. 30, 1994

Related U.S. Application Data

[63] Continuation of Ser. No. 201,212, Feb. 24, 1994, abandoned.

[30] Foreign Application Priority Data

Mar. 4, 1993 [CH] Switzerland .................... 00645/93

[51] Int. Cl.$^6$ ........................................ A61J 1/00
[52] U.S. Cl. .................. 206/531; 206/532; 428/36.7; 428/323; 428/324; 428/325
[58] Field of Search ................. 206/531, 532; 428/323, 324, 325, 36.7

[56] References Cited

U.S. PATENT DOCUMENTS

| | | | |
|---|---|---|---|
| 4,869,938 | 9/1989 | Usami et al. | 428/34.3 |
| 5,062,569 | 11/1991 | Hekal | 229/3.5 R |
| 5,145,737 | 9/1992 | Boiron et al. | 428/334 |

*Primary Examiner*—D. S. Nakarani
*Attorney, Agent, or Firm*—Bachman & LaPointe

[57] ABSTRACT

Lidding film, without metal foil, for lidding push-through forms of packaging, where the lidding film contains at least one polyolefin-based or polyester-based thermoplastic and the thermoplastic contains 5 to 50 wt % filler material. With the aid of a sealing layer the lidding film can, if desired, be sealed onto the bottom part of a push-through form of packaging or blister pack. The lidding film is inelastic to such a degree that the packaged contents can be pushed through the film.

21 Claims, 1 Drawing Sheet

BLISTER PACKS

This is a continuation of application Ser. No. 08/201,212, filed Feb. 24, 1994, now abandoned.

BACKGROUND OF THE INVENTION

The present invention relates to a lidding film, without metal foil, for push-through forms of packaging and a use for the said lidding film.

It is known to cover push-through forms of packaging, so called blister packs, with a layer that covers, and is sealed onto, the whole surface area and serves as the lid for the blister pack. The blister pack features one or more individual recesses each of which holds for example solid bodies, shaped solid preparations or pharmaceutical products such as tablets or dragees. If one single item, e.g. a tablet has to be removed from a blister pack the bottom part is pressed and the tablet pushed through the covering layer acting as a lid over the recess. As a tale the material of the covering layer is of aluminium foil or a laminate of which aluminium is a component part. Aluminium foil is a preferred material for the lidding layer on blister packs as relatively little force is required to break the foil at the thickness chosen for this purpose, the energy required for this is small and the aluminium exhibits essentially no elasticity. As a rule the bottom part of the blister pack is of plastic such as, e.g. PVC, polyamide, polyolefin, polyethylene-terephthalates and composites containing at least one of these materials, if desired also aluminium foil.

One disadvantage of these known blister packs is that they are a combination of plastic and aluminium that have to be separated for disposal so that both the plastic waste and aluminium waste can be recycled.

The object of the present invention is to provide a lidding material made up of materials that are basically of the same kind, m particular of the same or similar group of thermoplastics as the base material, and features all or most of the positive properties of aluminium.

SUMMARY OF THE INVENTION

The foregoing objects are attained by the blister packs of the present invention, wherein the blister packs include a lidding film for push-through forms of packaging. The lidding film is comprised of at least one polyolefin based or polyester based thermoplastic film. The thermoplastic film contains a filler material in a concentration amounting to 5 to 50 wt % based on the weight of the thermal plastic.

DETAILED DESCRIPTION OF THE PREFERRED EMBODIMENT

Figure 1:
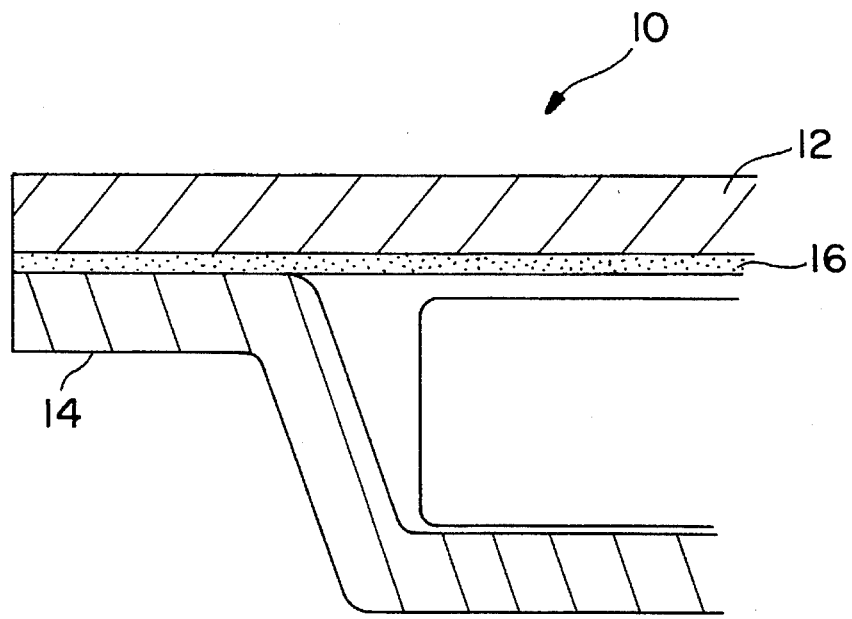
FIG. 1 is a cross-sectional view of a blister pack in accordance with the principles of the present invention.
Figure 2:
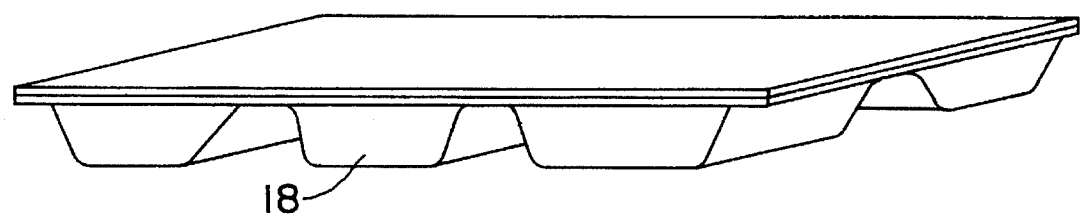
FIG. 2 is a perspective view of a blister pack of the present invention, showing a lidding film and a sealing layer.
Figure 3:
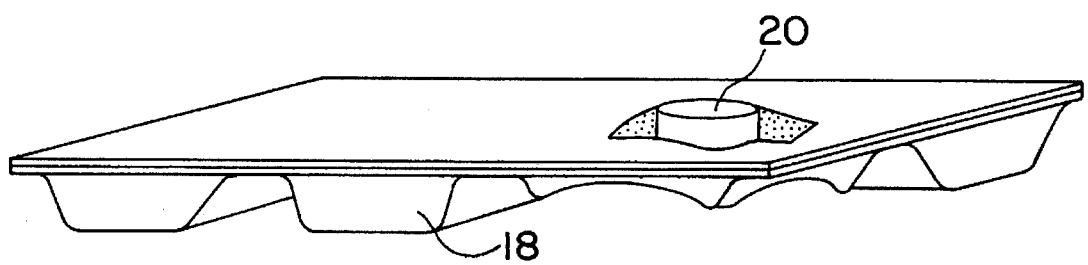
FIG. 3 is a perspective view of the blister pack showing a tablet being forced out of the pack and rupturing the lidding film.

Referring now to FIGS. 1–3 that objective is achieved by way of the invention 10 the form of a lidding film 12 containing at least one film of thermoplastic with polyolefin or polyester as basis, where the thermoplastic contains 5 to 50 wt % filler material with reference to the thermoplastic material.

A useful version is such that the film of thermoplastic is in the form of a monofilm or a composite containing at least one monofilm, the monofilms being polyolefin-based or polyester-based.

Examples of thermoplastics on a polyolefin basis are polyethylenes, e.g. high density polyethylene (HDPE, density greater than 0.944 g/cm$^3$), medium density polyethylene (MDPE, density 0.926–0.940 g/cm$^3$), linear medium density polyethylene (LMDPE, density 0.926–0.940 g/cm$^3$), low density polyethylene (LDPE, density 0.910–0.925 g/cm$^3$) and linear low density polyethylene (LLDPE, density 0.916–0.925 g/cm$^3$), polypropylenes, such as axial or biaxial oriented polypropylene or cast polypropylene, amorphous or crystalline polypropylenes or mixtures thereof, atactic or isotactic polypropylenes or mixtures thereof, poly-1-butene, poly-3-methylbutene, poly-4-methylpentene and copolymers thereof, such as e.g. of polyethylene with vinyl-acetate, vinyl-alcohol, acrylic acid, e.g. ionomer resins, such as copolymers of ethylene with about 11% acrylic acid, methacrylic acid, acrylic esters, tetrafluorethylene or polypropylene, and random copolymers, block-copolymers, mixtures or olefinpolymer-elastomer mixtures. Preferred is high density polyethylene (HDPE), low density (LDPE), homopolymers, copolymers, polypropylene or copolymers thereof and mixtures of polypropylene and polyethylenes. Especially preferred are mixtures of polypropylene containing, with reference to the polypropylene, 10 to 50 wt % of polyethylenes, such as HDPE.

Polyester-based thermoplastics are for example polyalkylene-tere-phthalates or polyalkylene-isophthalates with alkylene groups or radicals with 2 to 10 carbon atoms or alkylene groups with 2 to 10 C atoms that are interrupted by at least one —O—, such as e.g. polyethylene-terephthalate, poly-propylene-terephthalate, polybutylene-terphthalate (polytetramethylene-terephthalate polydecamethylene-terephthalate, poly- 1.4-cyclohexyldimethylol-terephthalate or polyethylene-2.6-naphthalene-dicarboxylate or mixed polymers of polyalkylene-terephthalate and polyalkylene-isophthalate wherein the fraction of isophthalate amounts e.g. to 1 to 10 Mol%, mixed polymers and terpolymers, and block polymers and grafted polymers of the above mentioned substances.

Other thermoplastics on a polyester basis are copolymers of terephthalic acid and a further polycarboxylic acid with at least one glycol. Usefully, also present are the copolymers of terephthalic acid, ethylene glycol and an additional glycol. Preferred are glycol modified polyesters known in the field as PETG.

Useful polyester-based thermoplastics are polyalkylene terephthalates with alkylene groups or radicals with 2 to 10 carbon atoms and polyalkylene terephthalates with alkylene groups or radicals with 2 to 10 carbon atoms that are interrupted by one or two —O—.

Preferred polyester-based thermoplastics are polyalkylene terephthalates with alkylene groups or radicals with 2 to 4 carbon atoms, and especially strongly preferred are polyethylene terephthalates. Belonging to these polyethylene terephthalates are also A-PET, PETP and the above mentioned PETG or G-PET.

Preferred films of thermoplastics are those containing olefin-based thermoplastics, and very strongly preferred are such of polyethylene, whereby again very strongly preferred among the polyethylenes are high density polyethylene (HDPE), polypropylene or copolymers thereof. Preferred are also polyesters and mixtures of polypropylene and polyethylene, for example mixtures of polypropylenes and, with reference to the polypropylene, 10 to 50 wt % polyethylene, such as HDPE.

The films of thermoplastics can include e.g. monofilms, or monofilm layers and composites of two or more films or layers of the above mentioned polymers and polymer mixtures or mixed, block, or grafted polymers or copolymers of the above mentioned polymers.

The polymers or plastic films can contain fillers such as e.g. stabilisers, softeners, pigments and processing agents.

The thickness of the individual plastic films making up the above mentioned composites can, e.g. in the case of ester-based thermoplastic films, be between 6 and 100 µm, usefully between 10 and 80 µm, preferably between 10 and 60 µm and, especially preferred, between 12 and 40 µm, or can in the case of olefin-based thermoplastics e.g. be from 3 to 140 µm, usefully 5 to 120 µm, especially 10 to 100 µm, advantageously 20 to 80 µm and preferably from 30 to 60 µm.

On employing polyester-based thermoplastics as monofilms, the thickness of the individual plastic films can e.g. lie between 10 and 100 µm, usefully 10 to 60 and preferably between 12 and 40 µm, and in the case of polyolefin-based thermoplastic films e.g. between 3 and 140 µm, usefully from 10 to 130 µm, usefully 40 to 120 and preferably between 40 and 100 µm.

The overall total thickness of the lidding film 12 according to the present invention is usefully about 10 to 200 µm, preferably 40 to 140 µm, and in particular 40 to 120 µm.

According to the invention the lidding film contains, with reference to the thermoplastic material, 5 to 50 wt %, preferably 20 to 45 wt % and especially preferred 40 to 45 wt % filler material. Examples of such filler materials are glasses, calcium carbonates, chalk calcite, precipitated calcium carbonate, calcium-magnesium dolomite, silicates, chalk, barium sulphates, carbon black, slate powder, pearl white, silica, hydrated alumina, kaolin, diatomite, mica, talcum or mixtures containing at least one or more of the mentioned substances. The diameter of the particles of filler materials is advantageously 1–15 µm, in particular 1–6 µm. The particles of filler material are usefully fibre-shaped, spherical or leaf-like in shape. Preferred filler materials are talcum, chalk and calcium carbonate.

The films can also be pigmented. The durability of the film can be increased by the pigments, depending on the amount and type of pigment. Inorganic and organic pigments are examples of pigments. Examples of such pigments are e.g. titanium-dioxide, zinc oxide or barium oxide. Also suitable are organic pigments in a concentration range up to 20 wt %, referred to the thermoplastic.

The films can be manufactured by producing a compound out of the thermoplastic, additives if desire& filler materials, pigments if desired and any processing agents, stabilisors etc., that are planned. The film can then be manufactured from this compound e.g. by cast-extrusion, coextrusion or blow-extrusion. It is also possible to produce a composite with two or more films. This can be carded out for example bycoating, extrusion-coating, coextrusion-coating or by blow-extrusion.

Blister packs 10, referring to FIG. 2, are very often intended to contain sensitive items. It can be useful, therefore, to make both the bottom part 14 and the lidding material such that gases, odours, aromas, moisture and fluids cannot permeate them, or if so only with difficulty, or if this is already the case then to improve the properties that are already provided. Usefully, this is achieved employing a blocking or barrier layer. Ceramic barrier layers and plastic barrier layers are, for example, suitable for this purpose.

Ceramic layers of oxides and/or nitrides of metals and/or metalloids produced by thin layer deposition in vacuum can be employed.

The ceramic layer is usefully deposited by a vacuum thin layer deposition process; plasma-aided physical vapour deposition processes (PDV) and chemical vapour deposition processes (CVD) can be employed. Physical coating processes are preferred, in particular those based on electron beam vaporisation, resistance heating or inductive heating from crucibles. Electron beam vaporisation is particularly preferred. The described processes can be reactive and/or promoted by ionisation.

The thickness of the ceramic layer can be from 5 to 1000 nm, thicknesses of 10 to 200 nm being preferred, in particular from 40 to 150 nm.

Ceramic layers that can be employed are oxides and/or nitrides of metals and/or metalloids, e.g. such as silicon, aluminium, iron, nickel, chromium, tantalum, molybdenum, magnesium, lead or mixtures thereof. Also included are the oxi-nitrides of the mentioned metals or metalloids.

The silicon oxides or aluminium oxides are useful as ceramic layers. They can have the general formula $SO_x$, where x is usefully a number from 1 to 2, preferably 1.1 to 1.9 and in particular from 1.1 to 1.7. The aluminium oxides can have the formula $Al_yO_z$, where y/z is e.g. a number from 0.2 to 1.5, preferably from 0.65 to 0.85.

Particularly preferred are permeability barrier layers in the form of a 10 to 500 nm thick ceramic layer of a silicon oxide with the general formula $SiO_x$, where x is a number of 1.1 to 1.7 or an aluminium oxide of the general formula $Al_yO_z$, where y/z represents a number from 0.2 to 1.5.

The permeability barrier layer, in the form of a ceramic layer, is in practice deposited on at least one side of at least one plastic film by means of one of the above mentioned processes. The plastic film serves accordingly as a substrate on which the ceramic layer is deposited.

The thickness and number of ceramic layers can be selected according to the requirements made of the blocking or barrier effect to be exercised on permeability.

For example a further plastic film or thermoplastic film can be coated on one side with a ceramic layer and the thermoplastic film or the other plastic film laid on the ceramic layer.

This last measure ensures that the ceramic layer or layers is/are not damaged during manufacture, processing, storage and transportation of the lidding film.

Plastic barrier layers can also be employed e.g. 5 to 100 µm thick films of polymers that are particularly resistant to permeation of gases and water. Polyvinylidenchlorides, polyolefins, ethylene-vinyl-alchol (EVOH), polyvinyl-chlorides, acrylnitrine-copolymers or biaxially stretched polyethylene-tere-phthalate deposited on the thermoplastic film are particularly favourable.

Lidding films 12 equipped in this manner feature high resistance to permeation of chemical, physical or microbial effects and so protect the packaged goods from oxidation, radiation or degradation. The barrier layer properties are excellent, especially towards air, oxygen and water vapour, moisture, aromas and odours.

All of the films and composites mentioned in this description can be employed unstretched, or uniaxially or biaxially stretched.

The lidding films 12 according to the present invention can feature, at least on the outside, a layer of a material such as a plastic film which can be printed on, or counterprinted at least in part; the printing can also be covered over with a protective coating (German "Schutzlack").

Sealing layers 16 e.g. in the form of sealing coatings or sealing layers can be provided at least on one side and in particular at least on the side of the lidding film according to the invention facing the bottom of the blister pack, at least in the edge regions or the edge flanges and the struts, referring to the bottom part, with the purpose of making contact with and sealing against the bottom part or also on the whole of the area of the lidding film facing inwards. The sealing layers 16 can be, for example, of ionomers, LLDPE, LDPE, MDPE, HDPE, polypropylene and polyethyleneterephthlate or contain these materials and be in the form of films or coatings. Ionomers or ion-containing polymers with the typical properties of ionomers are thermoplastic copolymers of olefines with carboxyl containing monomers of which a fraction is present as free carboxyl groups the rest bonded to metal cations so that a certain degree of cross-linking is achieved. Preferred sealing layers comprise or contain mixtures of polyolefins, such as mixtures of polyethylenes and polypropylenes for example mixtures containing polypropylenes with 10 to 50 wt % polyethylene referred to the polypropylene. Sealable films can be 3 to 140 μm thick. Also possible is to deposit one or more layers e.g. of a sealing coating or hot-sealing coating by applying a 1 to 10 μm thick layer of such coating material to the lidding film.

Sealing films can be deposited on the lidding film, for example by means of an extrusion process or coatings can be applied to the lidding film.

The lidding film may also be sealed on directly as such i.e. without using a sealing layer.

If desired, the surfaces of films or composites can be treated preferably by plasma or flame or corona treatment in order to increase the surface tension.

Consequently, lidding films according to the invention can contain for example the following layers:

a) a monofilm of a polyolefin-based or polyester based thermoplastic or a') a composite containing at least one polyolefin-based or polyester based thermoplastic film and preferably b) a sealing layer in the form of a sealing coating or a sealing film on one or both sides of a) or a').

Layer a) or a') can be provided with printing, printing with protective coating, protective coating a further plastic layer bearing a ceramic layer or a plastic barrier layer and/or a further plastic layer e.g. a sealing layer.

As a rule the bottom part 14 of the blister pack 10 can be of material based e.g. on polypropylene or polyethyleneterephthalate and copolymers thereof, in particular PETP. If polypropylene is employed, it can have e.g. up to 50 wt %, in particular 30 wt %, HDPE added to it. Accordingly, the same or similar thermoplastic material as in the bottom part can usefully be employed for the lidding film for the blister pack. Such packaging forms made of the above mentioned plastic films or plastic film composites are particularly suitable for regranulation and re-use in new plastic products.

This applies especially to blister packs that feature barrier layers out of ceramic materials. The extremely small amounts of metal and/or metalloid oxides or nitrides used to form the barrier layer, do not have any negative effects on reuse of such materials.

The lidding film according to the present invention must be able to withstand the tensions of a conversion treatment machine. The lidding film should therefore, exhibit a strength of more than 20 MPa and a maximum elongation of less than 800%.

The outer surface of the lidding film should be smooth in order, for example, to be able to print clearly on it. The required surface quality can for example be obtained via the roughness of the roll or by subsequently depositing a coating.

As mentioned above, the lidding film 12 is joined permanently to the bottom part 14 for example by sealing. Consequently, the lidding film must be able to withstand the sealing temperature which can for example lie in the region of 150° to 200° C. On sealing, each compartment 18, as shown in FIGS. 2 and 3 or recess in the bottom part is sealed tightly around the edges. The contents, e.g., a tablet 20, as shown in FIG. 3, of the compartment are therefore protected from external influences on all sides. The sealing must be chosen for strength such that the contents of the pack can be removed through the lidding film without the sealing breaking.

The lidding film can for example be manufactured in roll form, in sheets or as individual lids. The lidding film in the form of rolls or sheets can be processed into individual lids e.g. by cutting or stamping out, or by separating into individual lids. Usefully the shape of the lid in plan view corresponds to that of the blister pack.

The present invention relates also to the use of lidding film without metal foil for push-through or blister packs and in particular for lids for push-through or blister packs.

The lidding foil according to the invention is inelastic to such a degree that on pushing the contents, e.g., tablet 20, of a compartment 8 through the lid, the lidding film 12 bursts and gives access to the contents 20.

We claim:

1. A push-through container which comprises:

a base member having a recess therein for a packaged article;

a lidding film covering said base member and recess and bonded thereto, said lidding film comprised of a thermoplastic film selected from the group consisting of (1) a polyolefin-based thermoplastic film, and (2) a polyester-based thermoplastic film, said thermoplastic film containing a filler material in a concentration amounting to 5 to 50 wt. % based on the weight of the thermoplastic;

a packaged article in said recess; and wherein said lidding film is adapted to be perforated for removal of the article from the recess.

2. A container according to claim 1, wherein the recess is defined by a base portion, upwardly extending side walls, flange edges extending from the side walls and an open top covered by the lidding film, and wherein the lidding film is bonded to the flange edges and extends over the open top.

3. A container according to claim 1, wherein the base is a plastic material.

4. A container according to claim 1, wherein the container is a blister pack.

5. A container according to claim 4, having a plurality of recesses.

6. A container according to claim 1, wherein the lidding film is inelastic and is adapted to be perforated by pushing the article through the lidding film.

7. A container according to claim 1, wherein the base member is made up of a material which is compatible with the lidding film for recycling.

8. A container according to claim 1, wherein the lidding film has a thickness of 10 to 200 μm.

9. A container according to claim 1, wherein the lidding film and base member include a separate barrier layer bonded thereto.

10. A container according to claim 1, wherein the strength of the lidding film is more than 20 MPa.

11. A container according to claim 1, wherein the lidding film is a polyolefin based thermoplastic monofilm.

12. A container according to claim 1, wherein the lidding film is a polyester based thermoplastic monofilm.

13. A container according to claim 1, wherein the thermoplastic film is a composite containing at least one monofilm of polyolefin-based thermoplastic.

14. A container according to claim 1, wherein the thermoplastic film is a composite containing at least one monofilm of polyester-based thermoplastic.

15. A container according to claim 1, wherein the thermoplastic contains 20 to 45 wt. % filler material based on the weight of the thermoplastic film.

16. A container according to claim 1, wherein the polyolefin-based thermoplastic film is a mixture of polypropylene with 10 to 50 wt. % polyethylene based on the weight of the polypropylene.

17. A container according to claim 1, wherein the polyethylene is of the high density form.

18. A container according to claim 1, wherein the film has at least one side, the lidding film featuring a separate sealing layer adjacent the at least one side.

19. A container according to claim 1, wherein the filler material is selected from the group consisting of precipitated calcium carbonate, calcium-magnesium-carbonates, dolomite, silicates, barium sulphates, carbon black, slate powder, pearl white, silica, hydrated alumina, kaolin, diatomite, mica, talcum.

20. A container according to claim 1, wherein the filler material has a particle diameter of 1 to 15 μm.

21. A container according to claim 18, wherein a separate sealing layer is of less strength than the lidding film.

* * * * *